US008051475B2

(12) United States Patent
Poore et al.

(10) Patent No.: US 8,051,475 B2
(45) Date of Patent: Nov. 1, 2011

(54) COLLABORATION GATEWAY

(75) Inventors: Douglas A. Poore, Rome, NY (US); Scott Thomas, Raleigh, NC (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1176 days.

(21) Appl. No.: 11/728,914

(22) Filed: Mar. 27, 2007

(65) Prior Publication Data

US 2010/0031338 A1 Feb. 4, 2010

Related U.S. Application Data

(60) Provisional application No. 60/860,237, filed on Nov. 1, 2006.

(51) Int. Cl.
*G06F 9/00* (2006.01)
*G06F 15/16* (2006.01)
*G06F 17/00* (2006.01)

(52) U.S. Cl. ........... 726/12; 713/153; 713/156; 713/176

(58) Field of Classification Search .................... 726/12; 713/156, 153, 176
See application file for complete search history.

(56) References Cited

U.S. PATENT DOCUMENTS

| 5,634,127 | A  | * | 5/1997  | Cloud et al.     | 719/313 |
| 5,862,325 | A  | * | 1/1999  | Reed et al.      | 709/201 |
| 6,640,241 | B1 | * | 10/2003 | Ozzie et al.     | 709/204 |
| 6,735,621 | B1 | * | 5/2004  | Yoakum et al.    | 709/218 |
| 7,321,969 | B2 | * | 1/2008  | Schoen et al.    | 713/153 |
| 7,328,247 | B2 | * | 2/2008  | Penner et al.    | 709/206 |
| 7,363,381 | B2 | * | 4/2008  | Mussman et al.   | 709/230 |
| 7,366,192 | B2 | * | 4/2008  | Jabri et al.     | 370/410 |
| 7,395,424 | B2 | * | 7/2008  | Ashley et al.    | 713/156 |
| 7,412,518 | B1 | * | 8/2008  | Duigou et al.    | 709/227 |
| 7,418,475 | B2 | * | 8/2008  | Stewart et al.   | 709/204 |
| 7,428,590 | B2 | * | 9/2008  | Miller et al.    | 709/225 |
| 7,458,082 | B1 | * | 11/2008 | Slaughter et al. | 719/328 |
| 7,559,066 | B2 | * | 7/2009  | Ho et al.        | 719/330 |
| 7,590,696 | B1 | * | 9/2009  | Odell et al.     | 709/206 |
| 7,664,822 | B2 | * | 2/2010  | Miller et al.    | 709/207 |
| 7,707,401 | B2 | * | 4/2010  | Miller et al.    | 713/153 |
| 7,739,339 | B2 | * | 6/2010  | Borys et al.     | 709/206 |
| 7,774,832 | B2 | * | 8/2010  | Poling et al.    | 726/12  |
| 7,818,565 | B2 | * | 10/2010 | Miller et al.    | 713/153 |
| 7,882,265 | B2 | * | 2/2011  | Miller et al.    | 709/238 |
| 7,962,582 | B2 | * | 6/2011  | Potti et al.     | 709/220 |
| 2004/0088423 | A1 | * | 5/2004 | Miller et al.    | 709/229 |
| 2004/0103318 | A1 | * | 5/2004 | Miller et al.    | 713/201 |
| 2004/0109518 | A1 | * | 6/2004 | Miller et al.    | 375/356 |
| 2004/0111623 | A1 | * | 6/2004 | Miller et al.    | 713/182 |
| 2004/0136386 | A1 | * | 7/2004 | Miller et al.    | 370/401 |

(Continued)

OTHER PUBLICATIONS

Boyd Fletcher, XMPP & Cross Domain Collaborative Information Environment (CDCIE), Aug. 2006, http://www.sensornet.gov/net_ready_workshop/Boyd_Fletcher_CDCIE_XMPP_Overview_for_NetReadySensors_Conf.pdf.*

(Continued)

*Primary Examiner* — David Garcia Cervetti
(74) *Attorney, Agent, or Firm* — Joseph A. Mancini

(57) ABSTRACT

Method for exchanging information between heterogeneous secured networks. Method supports synchronous communications across security domains including text chat, instant messaging, audio applications, video applications, and whiteboard collaboration. The invention intercepts incoming information traffic on either side and employs a guard for filtering information traffic between security domains according to a policy engine.

7 Claims, 5 Drawing Sheets

U.S. PATENT DOCUMENTS

| | | | |
|---|---|---|---|
| 2004/0225752 A1* | 11/2004 | O'Neil et al. | 709/246 |
| 2005/0050152 A1* | 3/2005 | Penner et al. | 709/207 |
| 2005/0198125 A1* | 9/2005 | Macleod Beck et al. | 709/204 |
| 2005/0198299 A1* | 9/2005 | Beck et al. | 709/226 |
| 2005/0273496 A1* | 12/2005 | Jean et al. | 709/206 |
| 2006/0174103 A1* | 8/2006 | Verma et al. | 713/151 |
| 2006/0174323 A1* | 8/2006 | Brown et al. | 726/3 |
| 2006/0178893 A1* | 8/2006 | McCallie et al. | 705/1 |
| 2006/0236091 A1* | 10/2006 | Kaji et al. | 713/150 |
| 2006/0259555 A1* | 11/2006 | Hassounah et al. | 709/206 |
| 2007/0005711 A1* | 1/2007 | Hassounah et al. | 709/206 |
| 2007/0005786 A1* | 1/2007 | Kumar et al. | 709/230 |
| 2007/0016680 A1* | 1/2007 | Burd et al. | 709/227 |
| 2007/0076729 A1* | 4/2007 | Takeda | 370/401 |
| 2007/0124577 A1* | 5/2007 | Nielsen et al. | 713/151 |
| 2007/0293212 A1* | 12/2007 | Quon et al. | 455/420 |
| 2008/0005237 A1* | 1/2008 | Borys et al. | 709/204 |
| 2008/0162701 A1* | 7/2008 | Ryabchun et al. | 709/227 |
| 2008/0165789 A1* | 7/2008 | Ansari et al. | 370/401 |
| 2008/0189774 A1* | 8/2008 | Ansari et al. | 726/7 |
| 2008/0196099 A1* | 8/2008 | Shastri | 726/12 |
| 2008/0209213 A1* | 8/2008 | Astrand et al. | 713/168 |
| 2008/0256257 A1* | 10/2008 | Miller et al. | 709/238 |
| 2009/0019367 A1* | 1/2009 | Cavagnari et al. | 715/716 |
| 2009/0083638 A1* | 3/2009 | Gupta | 715/752 |
| 2009/0147772 A1* | 6/2009 | Rao et al. | 370/352 |
| 2009/0292773 A1* | 11/2009 | Leedberg et al. | 709/205 |
| 2010/0146608 A1* | 6/2010 | Batie et al. | 726/7 |

OTHER PUBLICATIONS

Sensors Workshop Notes, 2006, http://www.sensornet.gov/net_ready_workshop/Sensors%20Workshop%20Minutes.pdf.*

RFC-3923, Oct. 2004, IETF.org.*

RFC-3922, Oct. 2004, IETF.org.*

RFC-3921, Oct. 2004, IETF.org.*

RFC-3920, Oct. 2004, IETF.org.*

* cited by examiner

COLLABORATION GATEWAY

PRIORITY CLAIM UNDER 35 U.S.C. §119(e)

This patent application claims the priority benefit of the filing date of provisional application Ser. No. 60/860,237, having been filed in the United States Patent and Trademark Office on Nov. 1, 2006 and now incorporated by reference herein.

STATEMENT OF GOVERNMENT INTEREST

The invention described herein may be manufactured and used by or for the Government of the United States of America for governmental purposes without the payment of any royalty thereon.

BACKGROUND OF THE INVENTION

Technical Field of the Invention

This invention relates generally to the field of secure network communications. More specifically the present invention relates to securing communications across heterogeneous information networks.

The U.S. Intelligence Community (IC) faces an increasingly significant challenge in the timely acquisition, correlation and analysis of information. While information technology advances have resulted in the explosive growth in the volume and rate of data made available to the analyst, this seemingly limitless supply of raw intelligence threatens to overwhelm the human element of the intelligence processing system. Recent events serve to highlight the need for improved intelligence and collection management, particularly concerning Human Intelligence (HUMINT). Because of these challenges, intelligence analysis is becoming an increasingly distributed, collaborative endeavor. It is desirable to have secure information systems that support this collaboration, even if dissimilar.

In the intelligence production cycle, Communities of Interest (COI) are formed to collect, analyze and disseminate intelligence products. These COI teams are typically multi-disciplined, with different individuals performing different intelligence jobs and often are geographically distributed. They also often include members from different agencies, services, and possibly coalition forces. Due to the very nature of the IC, these different agencies and services each have their own private, secure networks, which create barriers to sharing information. In fact, these barriers have been cited in the media as a contributing factor as to why it was possible for the 2001 terrorist attacks to occur. Clearly, a method is needed to enable the various members of the IC to share necessary information without sacrificing security.

This need is further amplified when considering the United States as a global participant in the fight against terrorism. Obviously, the U.S. requires the assistance of international coalition partners in this fight, which requires intelligence information sharing across international intelligence agency boundaries. The process of authorizing data to be released to the U.S. coalition partners is slow and cumbersome. There is a paramount need for at least a semi-automated process to facilitate a quicker authorized dissemination of intelligence data from both international allied and domestic intelligence agencies.

To address the need of exchanging information between heterogeneous security networks, various prior art certified guarding methods have been considered. Most of the prior art, but not all of it, however, only supports email, file transfer capabilities, and/or highly-structured messaging for Common Operational Picture (COP) data. This is insufficient to satisfy the needs to which the present invention is addressed.

This limited functionality of the prior art is inadequate to address the needs outlined above. What is needed therefore to fulfill the perceived lack in the prior art is the capability to communicate on a real time basis, using text chat; archive and index these collaborations to facilitate research, trend analysis and information discovery; and semi-automate the process of releasing authorized information to international coalition partners.

OBJECTS AND SUMMARY OF THE INVENTION

The present invention provides cross-domain asynchronous communications capabilities of certified guards with a new capability for synchronous communication across security domains to include text chat, instant messaging, audio, video and whiteboard collaboration communications. Embodiments of the present invention provide for cross-domain text chat and instant messaging including compatibility with both one-to-one and group chat. Alternate embodiments of the present invention also include compatibility with cross-domain audio, video and whiteboard collaborations.

It is therefore an object of the present invention to provide a method to share information between privatized secure networks.

It is a further object of the present invention to provide a method to secure shared information between privatized secure networks.

It is still a further object of the present invention to provide a validation and authentication method to secure shared information between privatized secure networks.

It is yet still a further object of the present invention to provide a method for cross-domain, asynchronous network communications that supports text chat, instant messaging, audio, video and whiteboard collaboration.

An additional object of the present invention is to overcome a lack in the prior art wherein the security measures of implemented in privatized secure information networks would not support inter-network communications with other privatized, secure networks.

Briefly stated, the present invention achieves these and other objects by providing a method for exchanging information between heterogeneous secure networks. Method supports synchronous communications across security domains including text chat, instant messaging, audio applications, video applications, and whiteboard collaboration. The invention intercepts information traffic on either side and employs a guard for filtering information traffic between security domains according to a policy engine.

In the fundamental embodiment of the present invention, a software program method for providing secure communications across information networks, comprises digitally signing a user-generated message, forwarding said message to a conference server, determining said message type, and determining said message destination. If the message is an error message, then it is processed in the conference server. However, if the message is not an error message then the message is forwarded to a protocol proxy, a session validation request is generated and forwarded to a session manager, the session I.D. associated with that session is validated and the status of the validation step is returned. A determination is made whether the session I.D. is invalid, and if it is, then it is processed in the conference server. But if it is not invalid, an activity update is sent to a session manager, a validate message request is sent to a policy engine, the message is again validated and it is again determined whether the message is invalid. If the message is invalid, then a error is again returned. But if the message is not invalid, it is returned to the protocol proxy then forwarded to the media proxy where it is again determined whether it is invalid. If the message is invalid, then it is processed in the conference server. For a valid message, it is logged and sent to a far-side collaborative gateway. Schema and digital signatures are validated. Unauthorized or "dirty" words are checked for, digital signatures are removed from the message and resigned with the guard's private key. The message is forwarded to the far-side media proxy where it is logged, sent to the protocol proxy, then forwarded to the conference server. Message type and destination are determined whereupon it is forwarded to the user.

Still according to the fundamental embodiment of the present invention, a software program method for providing secure communications across information networks, validating a message further comprises determining whether the chatroom is a far-side room, and if it is, then determining whether a sender is allowed to communicate with an intended recipient. If the sender is allowed, then determining whether the chatroom is a near-side room. If the chatroom is a near-side room, then determining whether the sender is a member of that chatroom, and if he is, then determining whether the classification marking of said message is allowed. If the classification marking is allowed, then determining whether said digital signature is valid, and if it is valid, then returning the message to the protocol proxy. For messages that are not valid, rejecting them as non-authorized and generating an error message.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention provides a new capability to the cross-domain asynchronous communications capabilities of certified guards by providing synchronous communication across security domains including text chat, instant messaging, audio, video and whiteboard collaborations. Present embodiments of the invention provide for cross-domain text chat and instant messaging, though both one-to-one and group chat is supported. The invention is readily adaptable to alternate embodiments which provide cross-domain audio, video and whiteboard collaborations.

Figure 1:
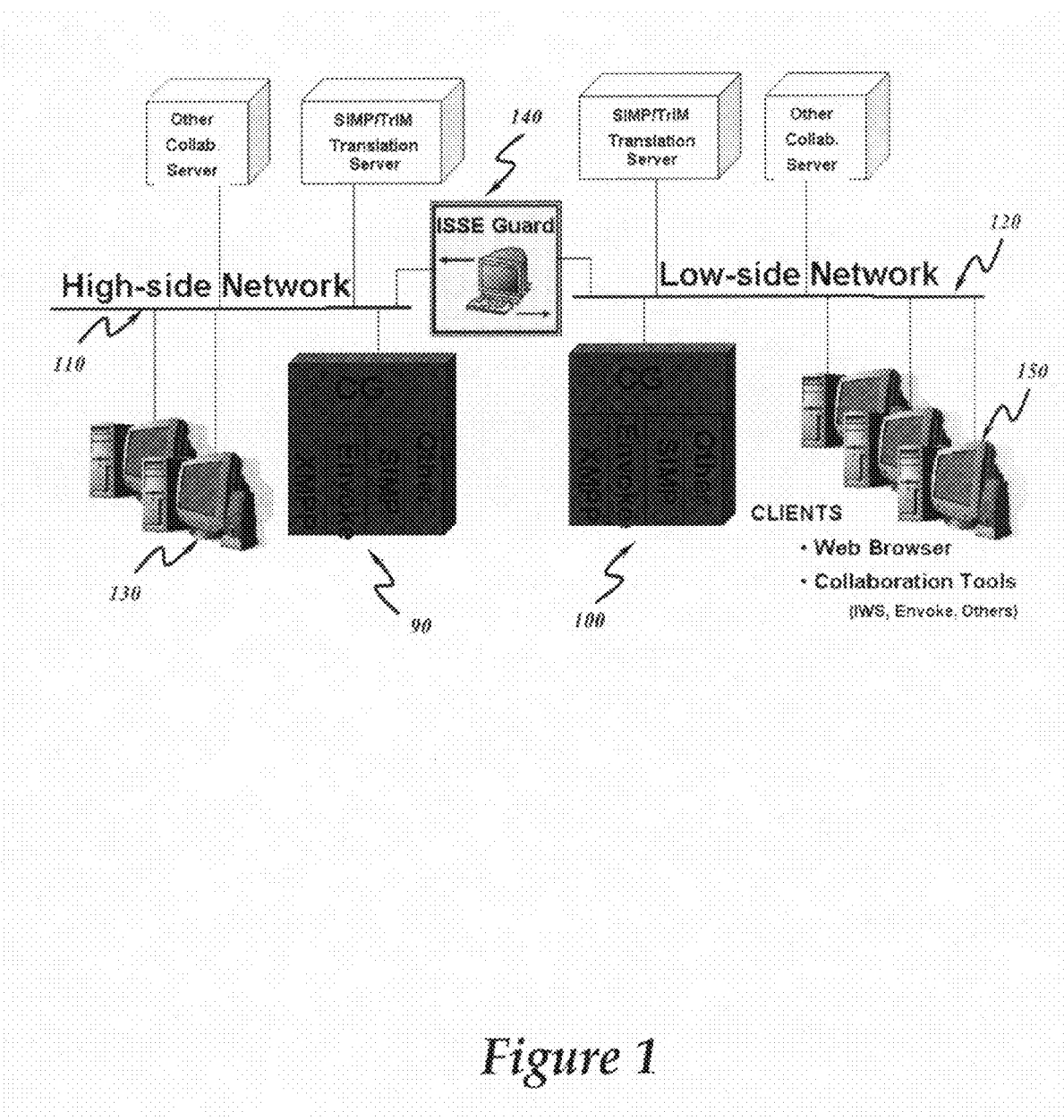
FIG. 1 depicts the high-level architecture of the present invention.

Referring to FIG. 1, the present invention, which can be functionally termed a "collaboration gateway" or "CG", is depicted in a secure network. The present invention is utilized in pairs with one such present invention 90 being located on a "high-side" network 110 and one such present invention 100 being located on a "low-side" 120 network. The pair of present inventions 90, 100 is responsible for intercepting and forwarding text chat and instant messaging traffic between high side clients 130 low side clients 150 on each of their respective sides. The present invention 90, 100 runs applications that support XML protocols, chat tools, and Public Key Infrastructure (PKI). The present invention 90, 100 communicates with a certified guard 140 using Secure Socket Layer (SSL). The guard application provides socket-based communications and supports any real-time application, such as text chat, instant messaging, shared whiteboard, and others.

Figure 2:
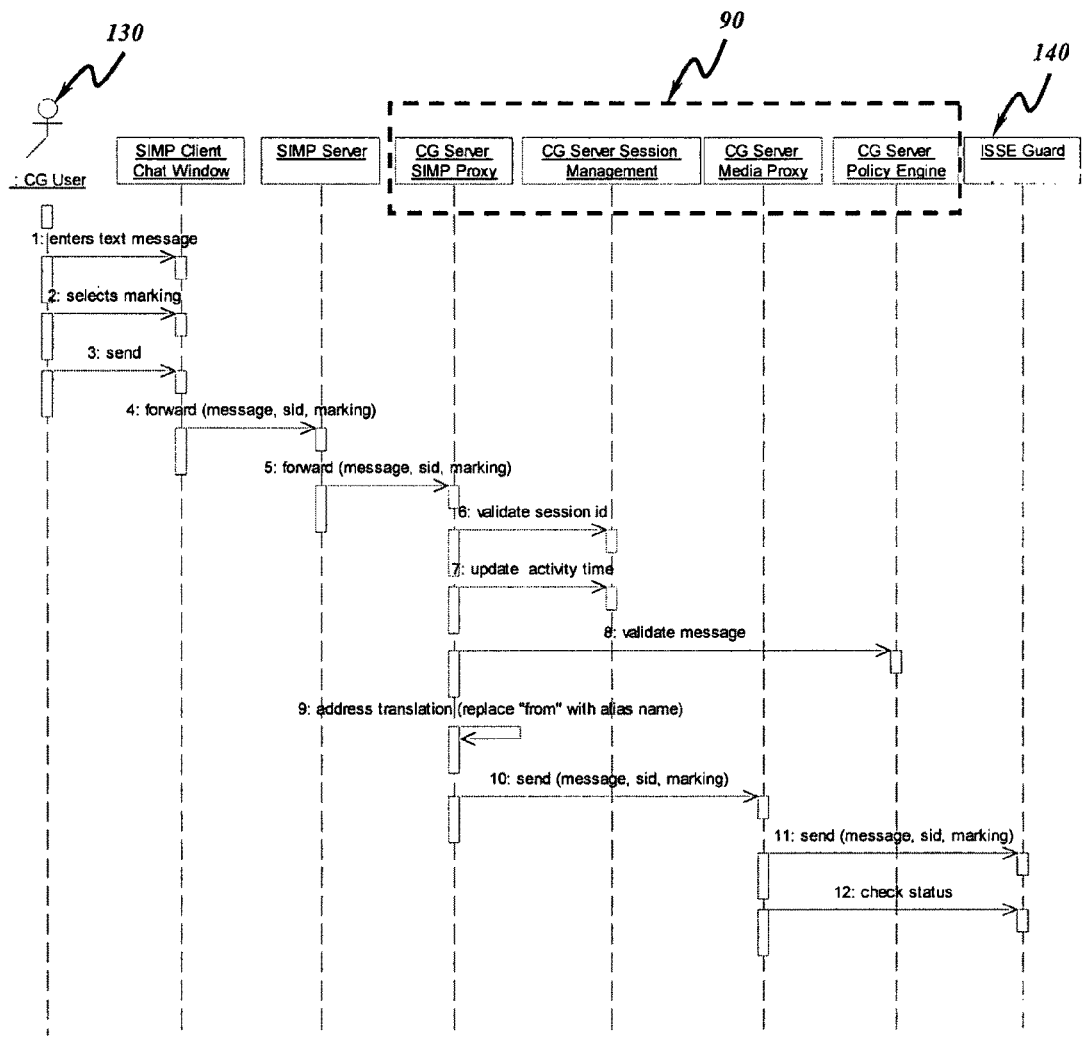
FIG. 2 depicts a sequence diagram of the present invention.

Referring to FIG. 2, a sequence diagram that illustrates the data flow and respective timelines (enumerated as "1" through "12") within the present invention 100 as interposed between the client 130 and the Guard 140. At first, the high side user/client 130 authenticates him/herself to the conference server by providing his/her user certificate. In the present embodiment of the invention, conference server implements the MITRE-developed Simple Instant Messaging & Presence (SIMP) protocol. When the user enters a message designated for a cross-domain user (identified by the username), conference server will forward it to the high side CG server of the present invention 90, which acts as a proxy for the recipient(s). This message is encrypted at the client's machine.

Still referring to FIG. 2, a timeline of only the high side is depicted. After verifying the high side sender's permissions to chat between the domains, present invention on the high side 90 will forward the encrypted message to the guard 140. The data flow is then reversed, and delivered to the low side client/recipient(s) 150 (see FIG. 1) on the other side of the guard 140. An embodiment of the present invention has been prototyped and demonstrated using the Internet Engineering Task Force (IETF) standard, eXtensible Messaging and Presence Protocol (XMPP) to facilitate transport between domains. The advantage of using XMPP in the present invention is two-fold:

(1) allows for common set of security filters on the guard; and (2) allows for interoperability between different collaboration tools These objectives of the present invention are critical in meeting the requirements for the operational users in the field. First, by using a common set of security filters, less development time is necessary to support new tools, and it will be easier for the required NSA certification process. Secondly, it is highly unlikely that there will ever exist a universal collaboration tool that everybody uses. Therefore, it is necessary that the present invention provide interoperability between a plurality of tools. This is best achieved by employing a standard protocol in the present invention that each tool's message stream can be transcoded to and from.

Figure 3:
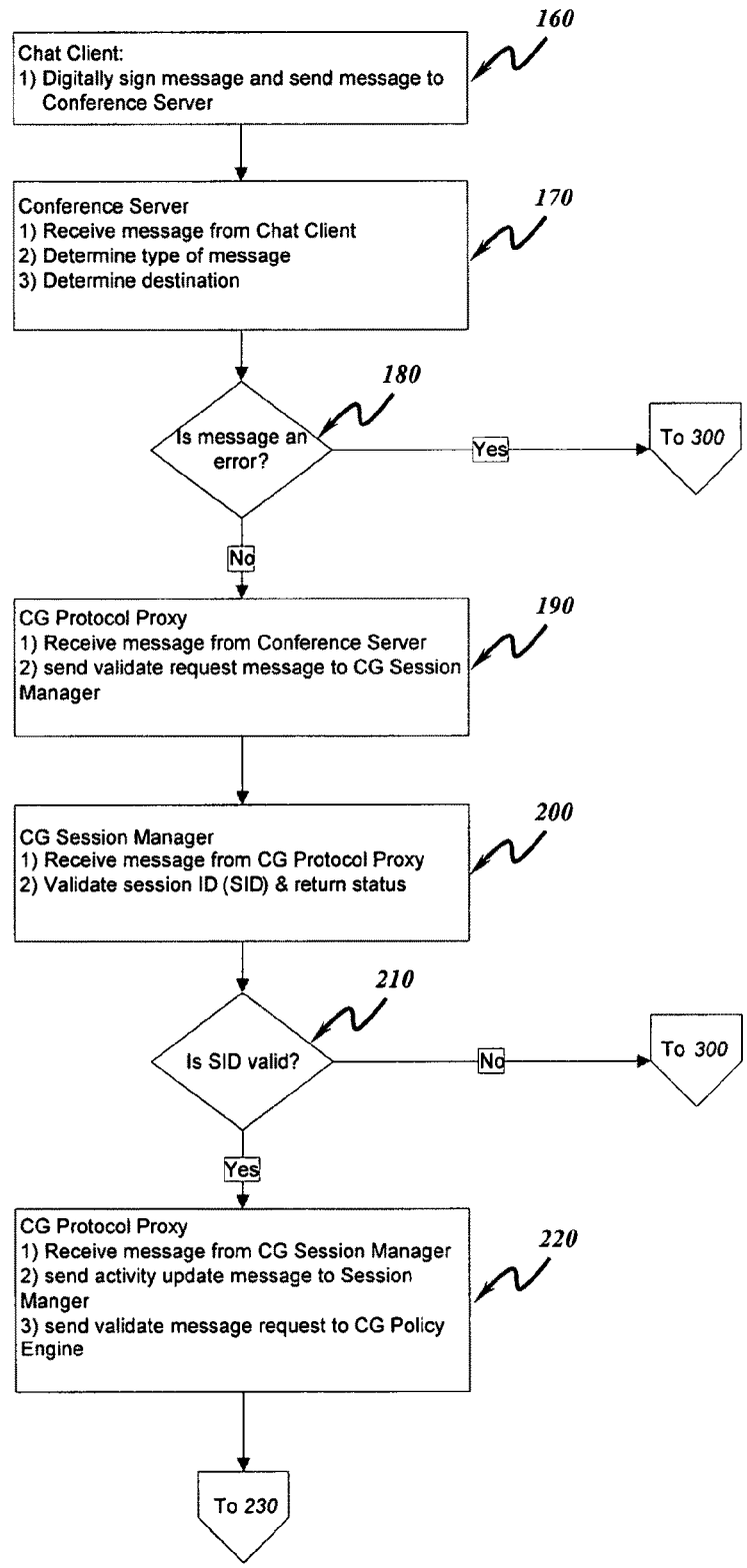
FIG. 3 depicts the process flow performed within the present invention.
Figure 4:
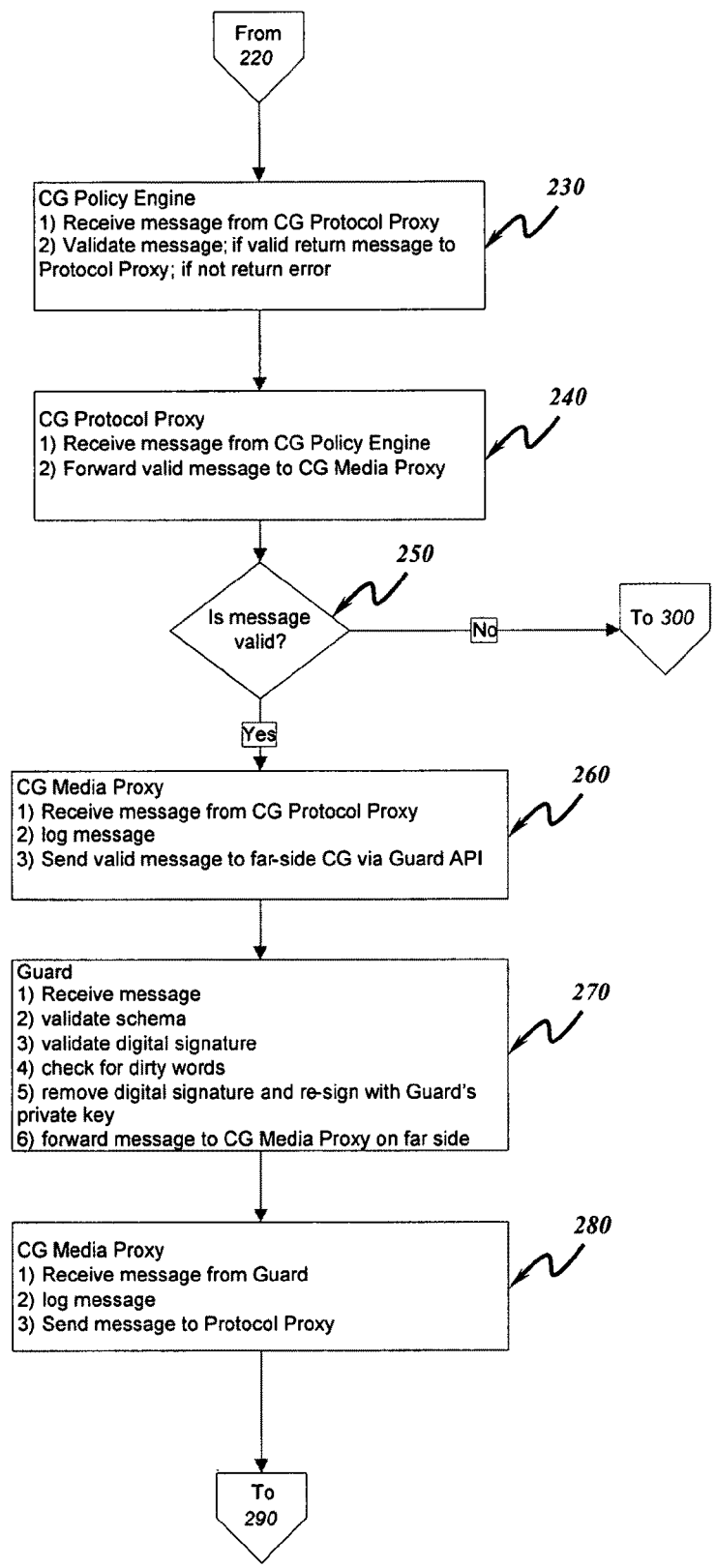
FIG. 4 depicts the process flow performed within the present invention.

Referring to FIG. 3, a flow diagram depicting the process steps performed by each component of the present invention, a high side user/client (see FIG. 1, 130) digitally signs a message and sends it 160 to the conference server. At the conference server, the message is received from the chat client and the message type and the message destination are then determined 170. Message destination is determined by instant message (IM) address. If the address is cross-domain, the message, the session I.D. and the classification marking of the message are forwarded to the invention's protocol proxy. A determination is made 180 as to whether the message received from the chat client is an error message. If it is determined that the message is an error message, such as would be the case when the process operates incorrectly, the protocol proxy sends the error message to the conference server where the message type and the message destination are determined and the error message is sent to the near user/chat client (see FIG. 5, 320) to inform him or her that the message was not delivered. If it is determined that the message is not an error message 180, the high side protocol proxy receives the message and sends 190 the message and a session validation request to the high side session manager. At the session manager an attempt is made to validate 200 the session I.D. of the received message. If validated, a successful status is returned 200. If it is determined 210 that the session I.D. (SID) is not valid, the high side session manager sends the message to the conference server where the message type and the message destination are determined and the message is sent to the near user/chat client (see FIG. 5, 320). In the process of validating, the present invention caches chatroom and user information including caching user addresses, user public keys, chatroom levels, chatroom membership, and cross-domain chatroom addresses. Otherwise, a message with a validated session I.D. is forwarded to the collaboration gateway protocol proxy where the activity time update message is generated and sent to the session manager, and a message validation request is sent to the policy engine 220. Referring to FIG. 4, the present invention, a collaboration gateway, upon receipt of the message validation request from the protocol proxy, the policy engine validates 230 the message using the policy information that was loaded into the invention during system initialization. If it is determined 250 that the message is valid, the policy engine further returns the message to the protocol proxy. 230 If available, any digital fingerprint contained in the message is also checked. If it is determined 250 that the message is not valid, the policy engine returns an error 230 and the message is sent to the conference server where the message type and the message destination are determined and the message is sent to the near user/chatroom client (see FIG. 5, 320). For a validated message, the protocol proxy will then forward 240 the validated message to the media proxy where it is logged 260 and sent to the far side collaboration gateway via the Guard API. The step of logging 260 comprises copying the message to a log file including the "to" and "from" username fields, the timestamp, and the text of the message. The guard receives the message and validates the schema and digital signature. 270 "Schema" describes the structure, content and the semantics of chat messages. The guard further checks the message for "dirty" words and removes the digital signature and resigns the message with the guard's private key. 270 "Dirty words" include a list of words that are classified and therefore may not be released from a higher security domain to a lower security domain. Lastly, the guard forwards 270 the message to the far side media proxy. The far side media proxy, once in receipt of the message, logs it and sends 280 the message to the protocol proxy.

Figure 5:
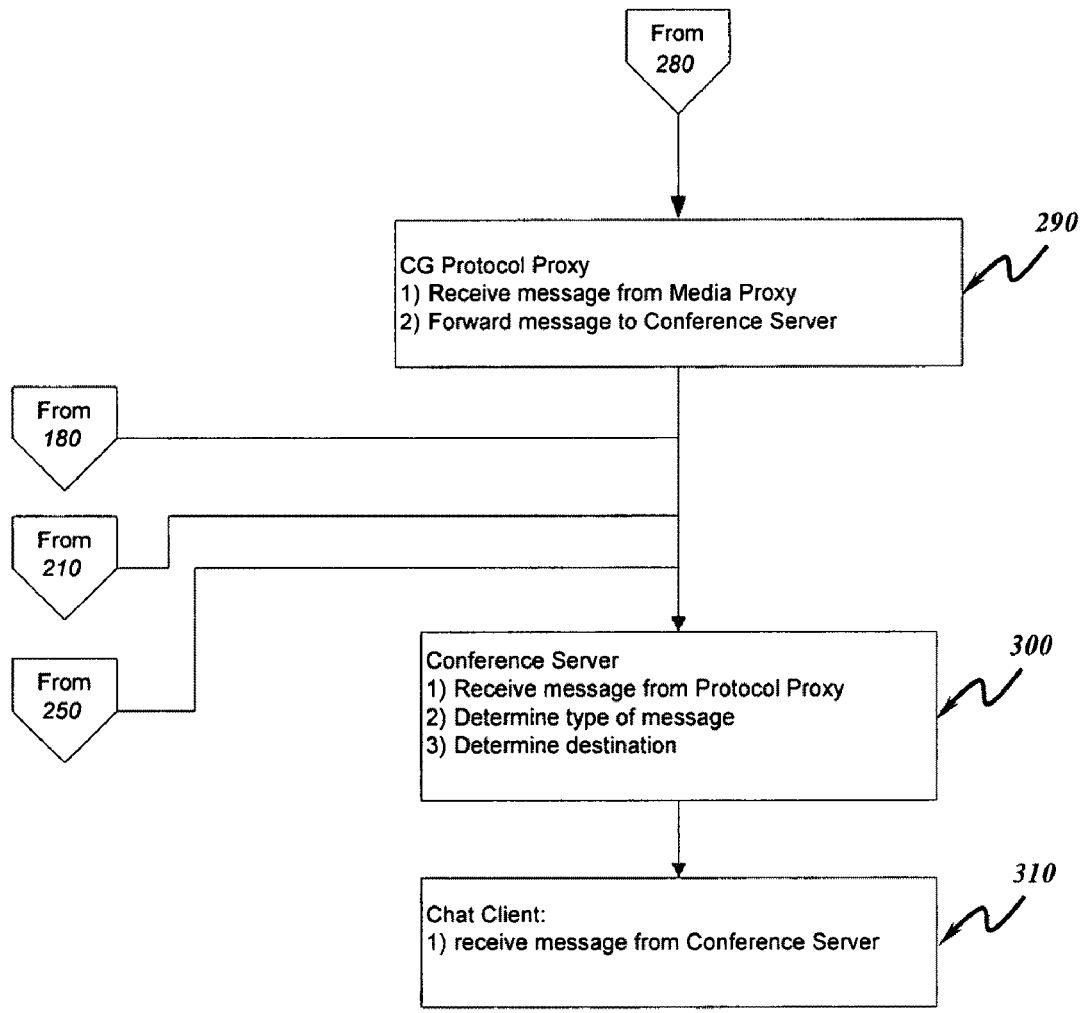
FIG. 5 depicts the process flow performed within the present invention.

Referring to FIG. 5, the present invention, a collaboration gateway, once the protocol proxy receives the message from the media proxy, it forwards 290 it to the conference server. The conference server receives this message from the protocol proxy as well as receiving messages from the protocol proxy when they are erroneous (see FIG. 3, 180); when the session I.D. is invalid (see FIG. 3, 210); and when the message is invalid (see FIG. 4, 250). In all of these instances, the conference server will determine 300 the type of message that is received and its destination. The chat client then receives 310 the message from the conference server.

What is claimed is:

1. In the field of information security, a software program method comprising a set of instructions, stored on a non-transitory computer-readable storage media, wherein said instructions, when executed by a computer, perform the necessary steps for providing secure communications across information networks, said steps comprising:
    digitally signing a user-generated message;
    forwarding said message to a conference server;
    determining said message type;
    determining said message destination;
    when said message is an error message, said steps further comprise processing said error message in said conference server;
    when said message is not an error message, said steps further comprise
        forwarding said message to a protocol proxy;
        generating a session validation request;
        forwarding said session validation request to a session manager;
        validating a session I.D. associated with said session;
        returning a status of said step of validating said session I.D.;
        determining whether said session I.D. is invalid;
    when said session I.D. is invalid, said steps further comprise processing said session I.D. in said conference server;
    when said session I.D. is not invalid, said steps further comprise
        sending an activity update to a session manager;
        sending a validate message request to a policy engine;
        validating said message;
        determining whether said message is invalid,
    when said message is invalid, said steps further comprise returning an error;
    when said message is not invalid, said steps further comprise
        returning said message to said protocol proxy;
        forwarding said message to a media proxy;
        a second step of determining whether said message is invalid;
    when said message is invalid, said steps further comprise processing said invalid message in said conference server;
    when said message is not invalid, said steps further comprise
        logging said message;
        sending said message to a far-side collaborative gateway;
        validating a schema;
        validating said a digital signature;
        checking for dirty words, wherein a dirty word is an unauthorized word that is classified at a higher security domain and may not be released to a lower security domain;
        removing said digital signature from said message;
        resigning said message with a guard's private key;
        forwarding said message to a far-side media proxy;
        a second step of logging said message;
        sending said message to said protocol proxy;
        a second step of forwarding said message to said conference server;
        a second step of determining said message type;
        a second step of determining said message destination; and
        forwarding said message to said user.

2. Method of claim 1, wherein all said steps of processing in said conference server further comprise the steps of
    determining said message type;
    determining said message destination;
    returning an error notification to said user; and returning said message to said user.

3. Method of claim 1, wherein said step of validating said message further comprises determining whether a chatroom is a far-side room;

when said chatroom is a far-side room, said step of validating said message further comprises determining whether a sender is allowed to communicate with an intended recipient;

when said sender is allowed to communicate with an intended recipient, said step of validating said message further comprises determining whether the chatroom is a near-side room;

when said chatroom is a near-side room, said step of validating, said message further comprises determining whether said sender is a member of that chatroom;

when sender is a member of said chatroom, said step of validating said message further comprises determining whether the classification marking of said message is allowed;

when said classification marking is allowed, said step of validating said message further comprises a second step of determining whether said digital signature is valid;

when said digital signature is valid, said step of validating said message further comprises a second step of returning said message to said protocol proxy;

when said digital signature is not valid, said step of validating said message further comprises rejecting said message as non-authorized; and generating an error message;

when said classification marking is not allowed, said step of validating said message further comprises a second step of rejecting said message as non-authorized; and a second step of generating an error message;

when sender is not a member of said chatroom, said step of validating said message further comprises a third step of rejecting said message as non-authorized; and a fourth step of generating an error message;

when said chatroom is not a near-side room, said step of validating said message further comprises a fourth step of rejecting said message as non-authorized; and a fourth step of generating an error message;

when said sender is not allowed to communicate with an intended recipient, said step of validating said message further comprises a fifth step of rejecting said message as non-authorized; and a fifth step of generating an error message.

4. Method of claim 1 wherein said step of logging further comprises copying said message to a log file including "to" and "from" username fields, timestamp, and text of said message.

5. Method of claim 1, wherein said step of validating further comprises caching user addresses, user public keys, chatroom levels, chatroom membership, and cross-domain chatroom addresses.

6. Method of claim 1, wherein said step of validating further comprises checking digital fingerprint.

7. Method of any one of claim 1, 2, 3, 4, 5 or 6, wherein said information networks are heterogeneous.

* * * * *